United States Patent
Tantawi et al.

(10) Patent No.: US 12,481,076 B2
(45) Date of Patent: Nov. 25, 2025

(54) BEAM MONITOR AND METHODS OF USE

(71) Applicant: TibaRay, Inc., Santa Clara, CA (US)

(72) Inventors: Sami Tantawi, Stanford, CA (US);
Luyao Xu, Santa Clara, CA (US);
Filippos Toufexis, Redwood City, CA (US)

(73) Assignee: TibaRay, Inc., Santa Clara, CA (US)

( * ) Notice: Subject to any disclaimer, the term of this patent is extended or adjusted under 35 U.S.C. 154(b) by 260 days.

(21) Appl. No.: 18/202,226

(22) Filed: May 25, 2023

(65) Prior Publication Data

US 2024/0027638 A1    Jan. 25, 2024

Related U.S. Application Data

(60) Provisional application No. 63/392,015, filed on Jul. 25, 2022.

(51) Int. Cl.
G01T 1/29      (2006.01)
H05H 9/00     (2006.01)

(52) U.S. Cl.
CPC ............. *G01T 1/2914* (2013.01); *H05H 9/00* (2013.01)

(58) Field of Classification Search
CPC ................................. G01T 1/2914; H05H 9/00
See application file for complete search history.

(56) References Cited

U.S. PATENT DOCUMENTS

| | | | |
|---|---|---|---|
| 2,830,268 A | 4/1958 | Kyhl | |
| 2007/0069126 A1 | 3/2007 | Mcintyre | |
| 2007/0115071 A1 | 5/2007 | Barov | |
| 2011/0089829 A1* | 4/2011 | Teryaev | H01J 25/10 315/5.39 |
| 2012/0294423 A1 | 11/2012 | Cheung et al. | |
| 2013/0315379 A1* | 11/2013 | Treas | H01J 35/16 315/505 |

(Continued)

OTHER PUBLICATIONS

Bergoz Instrumentation, "CR-BCM Preliminary", Cavity Resonator Beam Current Monitor brochure, 1 page.

(Continued)

*Primary Examiner* — Hugh Maupin
(74) *Attorney, Agent, or Firm* — Kilpatrick Townsend & Stockton LLP

(57) ABSTRACT

Beam monitors, methods of use and fabrication are provided herein. Beam monitors can include a rounded beam cavity with one or more waveguide connected thereto, from which a signal can be used to determine one or more beam characteristics. Such monitors can include a beam intensity monitor that includes a cylindrical beam cavity with a rectangular waveguide extending from a periphery, from which beam intensity can be determined. An advanced beam monitor can include a multi-moded beam cavity having multiple waveguides connected at distinct locations, each corresponding to a differing excitation mode. Such monitor can include an elliptical beam cavity and five waveguides connected thereto, signals from which can be used to determine beam charge, beam position and beam size in both the x-direction and y-directions. Beam monitors can be stand-alone devices or integrated within linear accelerators. Accelerators can include off-axis beam monitor coupling ports and on-axis tuning features.

37 Claims, 13 Drawing Sheets
(11 of 13 Drawing Sheet(s) Filed in Color)

(56) References Cited

U.S. PATENT DOCUMENTS

2015/0313001 A1    10/2015    Harasimowicz et al.
2021/0128949 A1*    5/2021    Caldara ................ A61N 5/1067
2023/0173305 A1*    6/2023    Roberts ................ A61N 5/1071
                                                                                           250/252.1

OTHER PUBLICATIONS

Inoue et al., "Development of a High-Resolution Cavity-beam Position Monitor", Physical Review Special Topics—Accelerators and Beams, vol. 11, No. 6, Jun. 2008, pp. 062801-1-062801-13.

Kim et al., "Cavity Beam Position Monitor System for the Accelerator Test Facility 2", Physical Review Special Topics—Accelerators and Beams, vol. 15, No. 4, Apr. 10, 2012, pp. 042801-1-042801-16.

Kim et al., "Resonant-cavity approach to noninvasive, pulse-to-pulse emittance measurement", Review of Scientific Instruments, vol. 76, 125109, 2005, pp. 125109-1 thru 125109-13.

Miller et al., "Nonintercepting Emittance Monitor", Stanford Linear Accelerator Center, Stanford University, Aug. 1983, pp. 602-605.

Srinivasan et al., "Beamline characterization of a dielectric-filled reentrant cavity resonator as beam current monitor for a medical cyclotron facility", Physica Medica 78, 2020, pp. 101-108.

Su et al., "Design and cold test of a rectangular cavity beam position monitor", Chinese Physics C, vol. 37, No. 1, 2013, pp. 017002-1 thru 017002-6.

Walston et al., "Performance of a High Resolution Cavity Beam Position Monitor System", Nuclear Instruments and Methods in Physics Research, vol. 578, Jul. 2007, 22 pages.

\* cited by examiner

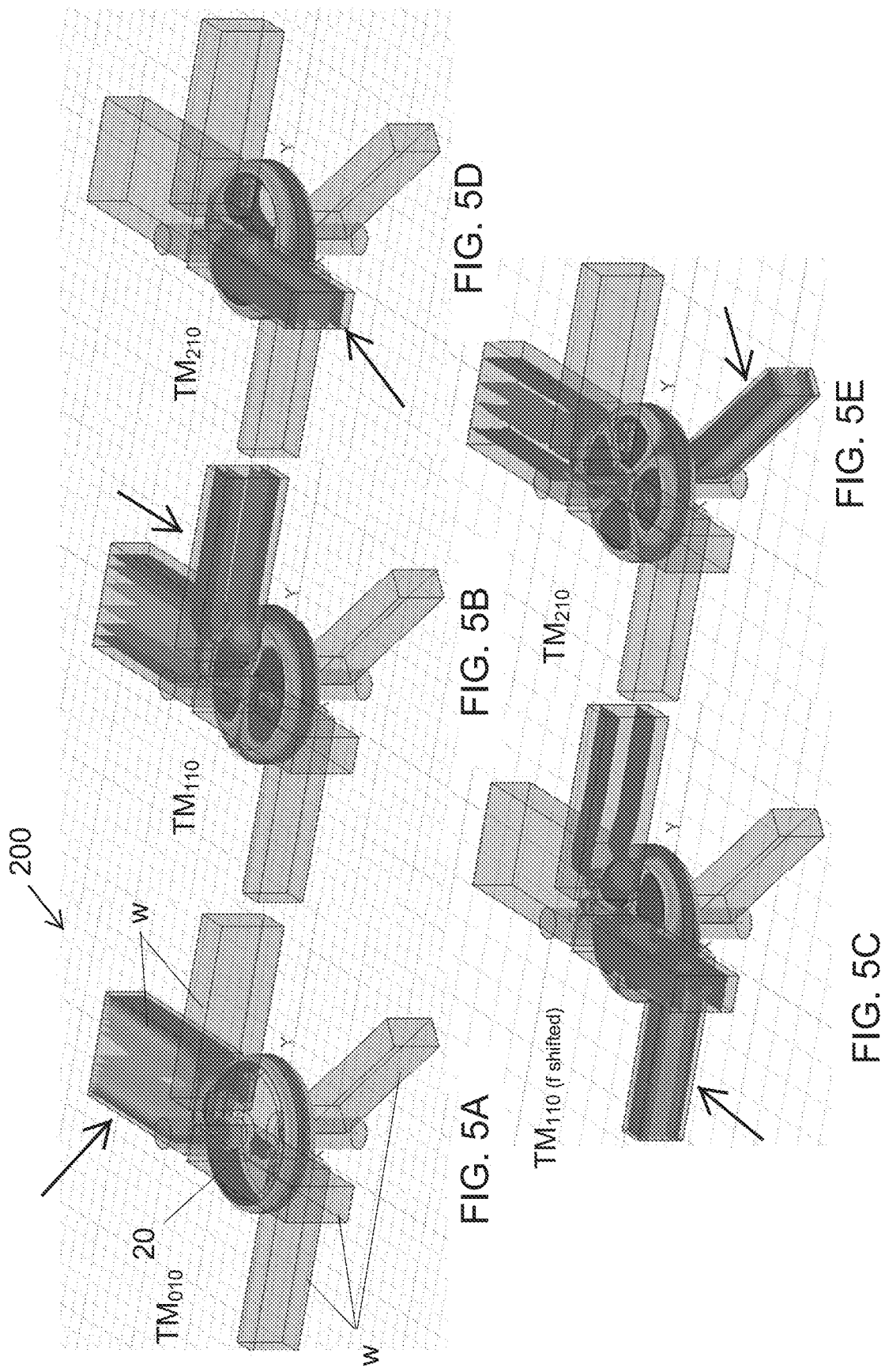

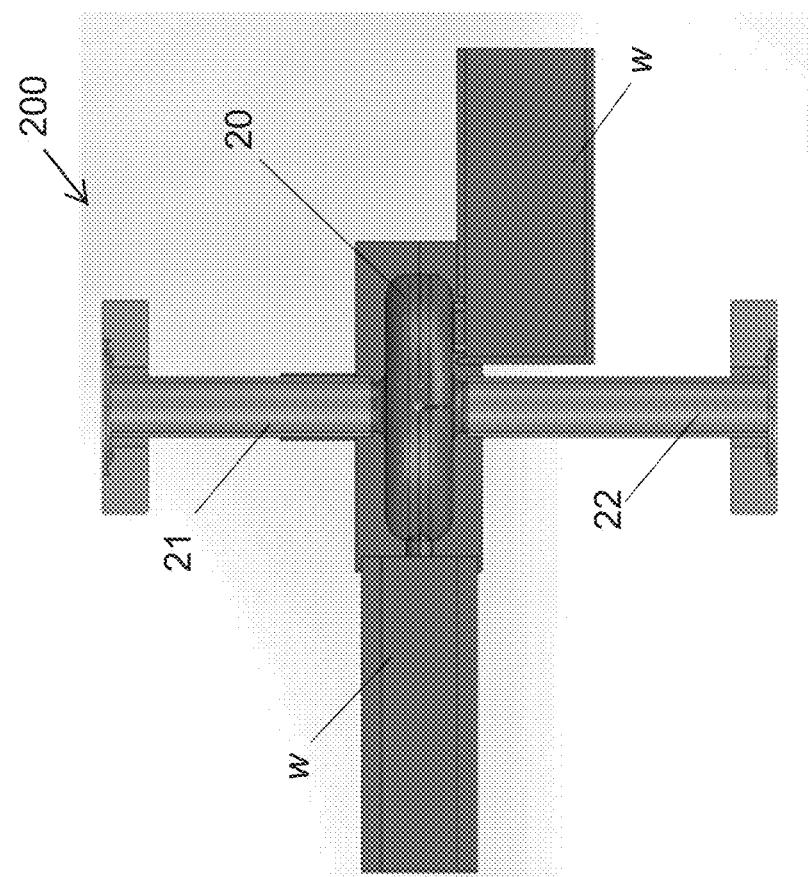
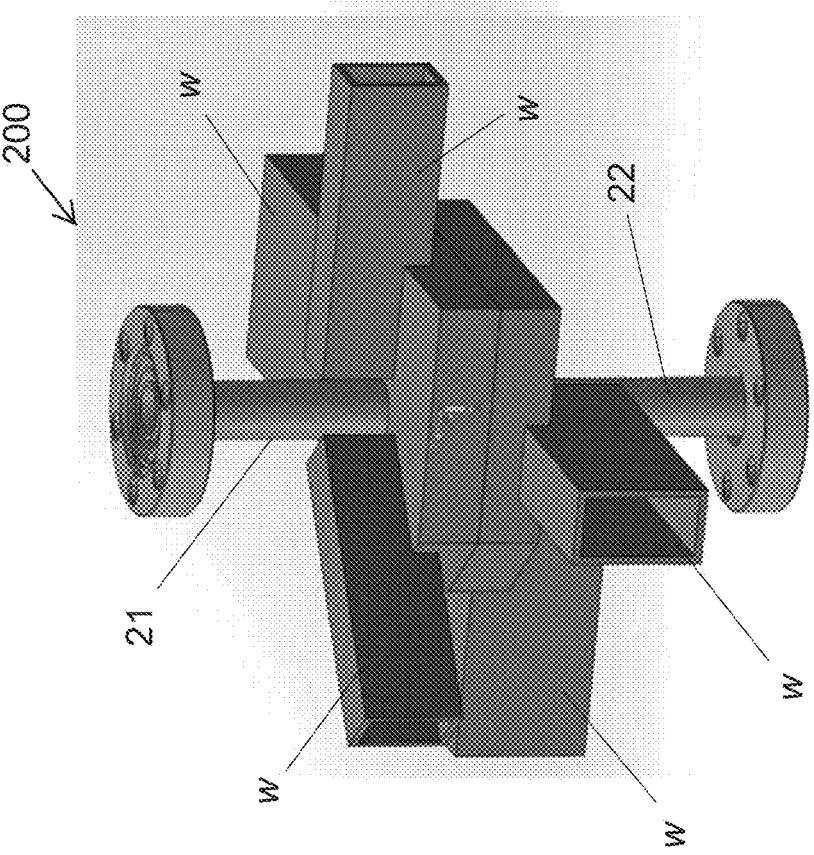
FIG. 6A
FIG. 6B

BEAM MONITOR AND METHODS OF USE

CROSS-REFERENCES TO RELATED APPLICATIONS

This application is a Non-Provisional of and claims the benefit of priority of U.S. Provisional Application No. 63/392,015 filed on Jul. 25, 2022, the entire contents of which are incorporated herein by reference.

STATEMENT AS TO RIGHTS TO INVENTIONS MADE UNDER FEDERALLY SPONSORED RESEARCH AND DEVELOPMENT

This invention was made with government support under Grant DE-SC0019574 awarded by the U.S. Department of Energy. The government has certain rights in the invention.

BACKGROUND OF THE INVENTION

The present invention relates generally to beam monitors, particularly for measuring beam characteristics in medical linear accelerators.

Both large linear accelerator systems existing in national laboratories and industrial and medical accelerators require accurate and real-time beam controlling system, especially for accelerators that are used in radiation therapy. Complete beam information needs to be monitored to tune or turn off the beam in a fast time scale for safety purposes, however, existing beam monitors typically are only capable of measuring certain attributes at a time. For example, measurement of one attribute may adversely affect measurement of another attribute. Therefore, measurement of complete beam information may not be feasible for some setups, or may require complex procedures, indirect measurements, or multiple separate measuring devices, which further increase size, and complicate manufacturing.

Thus, there exits a need for improved beam monitor devices that allow for accurate measurement of beam information in a simple, non-destructive manner. There is additionally need for such devices that provide complete beam information and that are relatively compact and can be incorporated into a single device, and that can be integrated within the overall system.

BRIEF SUMMARY OF THE INVENTION

The present invention relates generally to beam monitors, particularly for measuring beam characteristics in medical linear accelerators.

In one aspect, the invention pertains to a beam intensity monitor that includes a rounded or circular beam cavity having a central input and output and that is coupled to a waveguide by which the intensity of the beam can be measured. In some embodiments, the output is substantially larger in diameter (e.g., four times or greater) than the input. In some embodiments, the beam monitor includes a single circular beam cavity and a rectangular waveguide coupled to the beam cavity by a ceramic window. In some embodiments, the waveguide extends from a periphery of the beam cavity. The beam monitor can be integrally formed with an accelerator body of a linear accelerator, the beam cavity being at a distal end, or the beam monitor can be separately fabricated as a stand-alone device and coupled with an existing accelerator. The beam monitor can further be incorporated into a control system that determines the beam intensity from a signal of the waveguide, thereby measuring beam intensity directly from the beam in real-time, which can be fed back into a beam control system.

In another aspect, the invention pertains to an advanced beam monitor that simultaneously measures multiple beam characteristics from the beam by utilizing multiple waveguides coupled at differing locations on a multi-moded beam cavity, each location corresponding to a distinct mode. In some embodiments, the beam cavity is elliptical having an eccentricity sufficient to shift the frequency of an excitation mode into two modes, thereby allowing sufficient excitation modes to measure additional beam characteristics, such as beam position and size in both an x-direction and y-direction. In some embodiments, the beam monitor is configured to detect beam charge, beam position (both x and y) and beam size (both x and y). In some embodiments, the beam monitor includes five excitation modes and five waveguides that are connected to the beam cavity by RF windows at differing locations to allow detection of a signal from each of the respective excitation modes. In some embodiments, the beam unit includes one waveguide coupled to a periphery of the elliptical beam cavity, two waveguides coupled to one major face of the beam cavity and two waveguides coupled to an opposite major face of the beam cavity, thereby allow for signal measurement from each of the five modes simultaneously within a relatively compact device. The beam monitor can further be incorporated into a control system for measuring in real-time beam characteristics directly from the beam, via signals from the waveguides, which can be fed back into a beam control system.

In another aspect, the invention pertains a method for making a linear accelerator with integrated beam monitor where one or more coupling ports for the beam monitor are off-axis from the linear accelerator so that the tuning of the cavity can be performed from an on-axis tuning pin or feature. In some embodiments, the integrated beam monitor includes two ports which allows for reduction of the quality factor ("Q-factor") of the beam monitor to any desired value and hence the control the amount of radiation received from one of the coupling ports. This control results in savings in external components needed to attenuate the strong signal emitted from the beam monitor. On the other hand, the Q-factor can be raised if the current passing through is too small to generate an RF signal. By measuring the phase of the signal coming out of the beam monitor, and combining that with the linear accelerator simulations, one can estimate the energy of the beam.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A-5E illustrate an electric field map of five different modes of a beam monitor with give couplers, an exemplary beam monitor, in accordance with some embodiments.

FIGS. 6A-6D illustrate various views of an advanced beam monitor, in accordance with some embodiments.

DETAILED DESCRIPTION OF THE INVENTION

Figure 1A:
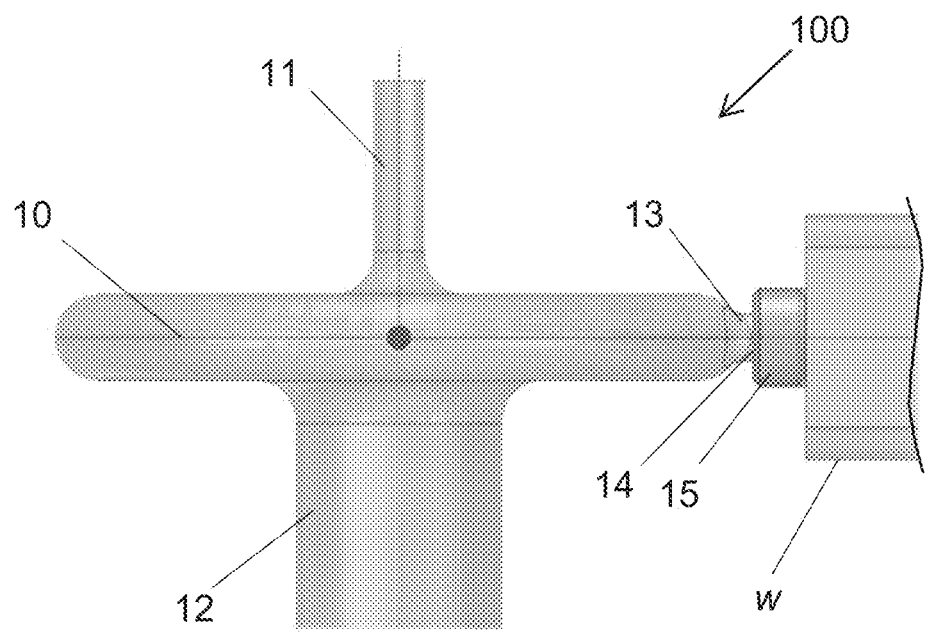
FIGS. 1A-1C illustrate a side view, end view and top view of a beam intensity monitor, in accordance with some embodiments.

The present invention pertains to beam monitors for linear accelerators (LINACs).

Conventional linear accelerator systems existing in national laboratories and industrial and medical accelerators require accurate and real time beam controlling system, especially for accelerators that are used in radiation therapy, which require more complete information as to beam characteristics. Complete beam information needs to be monitored to tune or turn off the beam in fast time scale for safety purpose. Typically, complete beam information includes at least beam intensity, position and size information. In some embodiments, beam information can include any of: modes of operation, beam current, charge, position, size, emittance, or any combination thereof. Existing beam monitors typically measure the beam's longitudinal modes using the beam current or the bunch charge. Beam position monitors measure the beam position using the transverse modes. Lower coupling between degenerate transverse modes reduces the accuracy and sensitivity. Quadrupole modes can be used to measure beam sizes; but again, degeneracy spoils accurate measurements.

Conventional approaches to measuring beam information and developments in the field can be further understood by referring to the following publications: R. H. Miller, J. E. Clendenin, M. B. James, and J. C. Sheppard, *Proceedings of the* 12*th International Conference on High Energy Accelerators*, Batavia, I L, 1983; SLAC-PUB-3186; J. S. Kim, C. D. Nantista, R. H. Miller, A. W. Weidemann, "Resonant-cavity approach to noninvasive, pulse-to-pulse emittance measurement," Review of Scientific Instruments, Vol 76, page 109-125, 2005, Kim, Y. I., R. Ainsworth, A. Aryshev, S. T. Boogert, G. Boorman, J. Frisch, A. Heo et al. "Cavity beam position monitor system for the Accelerator Test Facility 2." *Physical Review Special Topics-Accelerators and Beams* 15, no. 4 (2012): 042801; Jia-Hang, Sudu. Ying-Chao, Hua. Jian-Fei, Zheng Shu-Xin, Qiu Jia-Qi, Yang Jin, Huang Wen-Hui, C. H. E. N. Huai-Bi, and Tang Chuan-Xiang. "Design and cold test of a rectangular cavity beam position monitor." *Chinese Physics C* 37, no. 1 (2013): 017002; Inoue, Yoichi, Hitoshi Hayano, Yosuke Honda, Toshikazu Takatomi, Toshiaki Tauchi, Junji Urakawa, Sachio Komamiya et al. "Development of a high-resolution cavity-beam position monitor." *Physical Review Special Topics-Accelerators and Beams* 11, no. 6 (2008): 062801; Walston, Sean, Stewart Boogert, Carl Chung, Pete Fitsos, Joe Frisch, Jeff Gronberg, Hitoshi Hayano et al. "Performance of a high resolution cavity beam position monitor system." *Nuclear Instruments and Methods in Physics Research Section A: Accelerators, Spectrometers, Detectors and Associated Equipment* 578, no. 1 (2007): 1-22, the entire contents of which are incorporated herein for all purposes.

In one aspect, a beam monitor as described herein can combine all modes of operation, the longitudinal, transverse modes and quadrupole modes into one unit and effectively eliminate degeneracy. Such beam monitor devices can also be integrated within the LINAC, for example, by use of a split structure manufacturing technique. This approach can be used for measuring the beam characteristics including the emittance of the beam.

Currently, there is a large gap between accelerator systems deployed and demand for treatment. As more reliable and cheaper accelerator systems become available, the number of such systems deployed will increase. The improved beam monitors described herein can become a crucial part of an accelerator system as it improves reliability and can reduce the overall cost of deployment of such accelerator systems.

Although beam control is critical to the optimal operation of accelerators, both for the large systems that exists in national and international laboratories and for industrial and medical accelerators, it is often compromised by the high costs of diagnostic detectors and the need for information from multiple detectors to generate a complete picture of what is happening to the beam. Moreover, some of the measurements are destructive to the beam, rely on indirect beam measurements, or require lengthy complex procedures to interpret results. Ideally, one would prefer a fast, non-destructive beam monitor that can provide beam intensity, position and size information almost instantaneously and be able to operate fast enough to diagnose individual beam bunches. It is also required, however, for such devices to be affordable and economical enough for widespread.

In some embodiments, the invention pertains to a cavity monitor that can directly and accurately measure beam intensity. In some embodiments, the invention pertains to cavity monitors in which the azimuthal symmetry is perturbed and hence the different polarizations of the dipole and quadrupole modes are shifted in frequency. Adding this additional frequency information to the amplitudes will allow a single cavity to provide at least five pieces of information related to the charge, the horizontal and vertical dipole modes and the two polarizations of the quadrupole modes. This novel approach can provide for a compact device that can non-destructively monitor the beam position, size and eventually emittance at high repetition rates. Moreover, installing multiple monitors in a FODO lattice in high energy accelerators, such as LCLS-II, allows for fast emittance measurements. Three different beam monitors are described in the examples below, although, it is appreciated that these are merely examples and that variations of these embodiments can be realized in keeping with the inventive concepts described herein.

In a first aspect, the invention pertains to a beam intensity monitor, which can be utilized in both medical and industrial applications. The beam intensity monitor is a cavity monitor that can be produced separately and attached to an accelerator, or can be integrated with the accelerator itself. In some embodiments, the beam monitor includes a single rounded cavity (e.g., cylindrical cavity), a ceramic window (e.g., RF window), and a coupling waveguide (e.g., rectangular waveguide). In this embodiment, the waveguide extends from a periphery of the circular beam cavity, a position which corresponds to an excitation mode of the beam cavity such that measuring energy within the rectangular waveguide corresponds to the beam intensity. The rectangular waveguide can be connected to a signal sensor, which in turn, is connected to a control unit that processes the signal to determine beam intensity and which optionally can be fed back to the beam control to generate the desired beam intensity. In some embodiments, the ratio of radius and height of the cavity is maintained at 4:1 to allow the construction of the cavity from two pieces cut along a plane that passes through the center line of the cavity. The electromagnetic simulations discussed herein for the beam monitor cavity have been performed by using high frequency simulation software (HF SS).

Figure 1B:
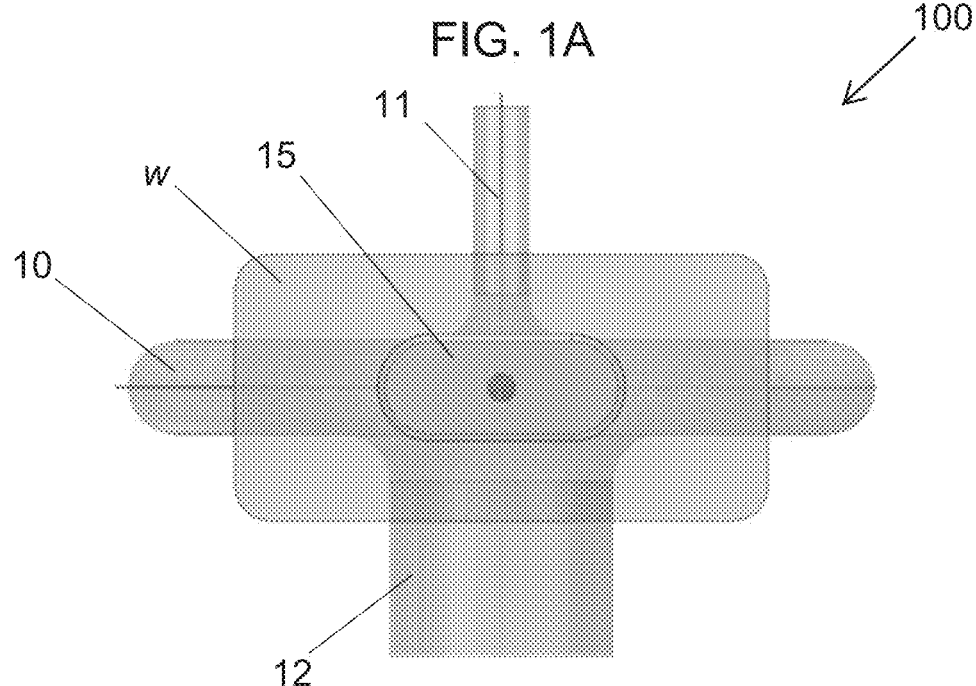
Figure 1C:
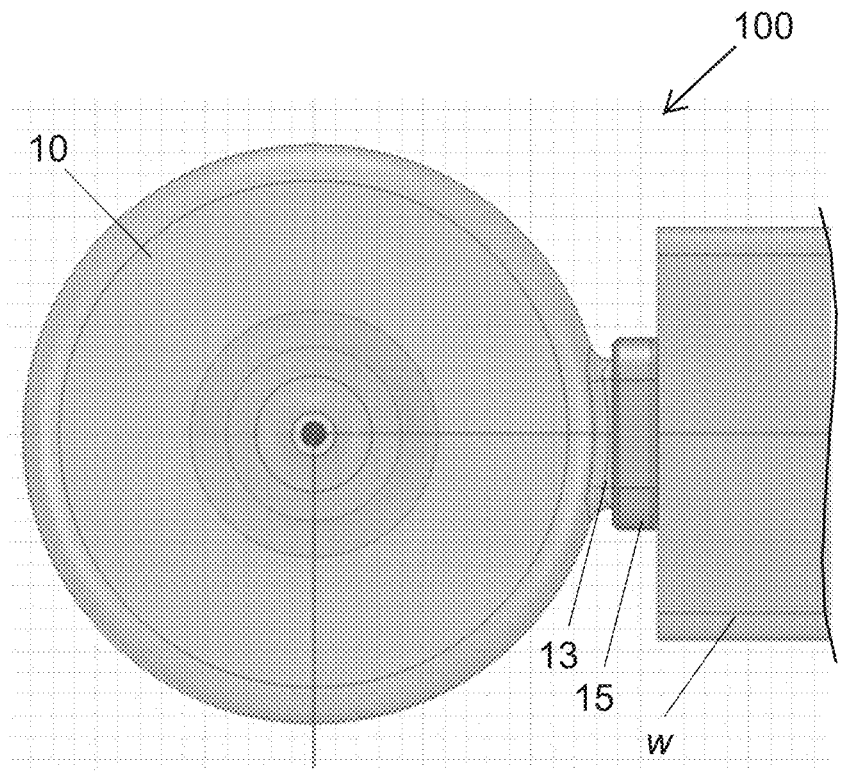
Figure 1D:
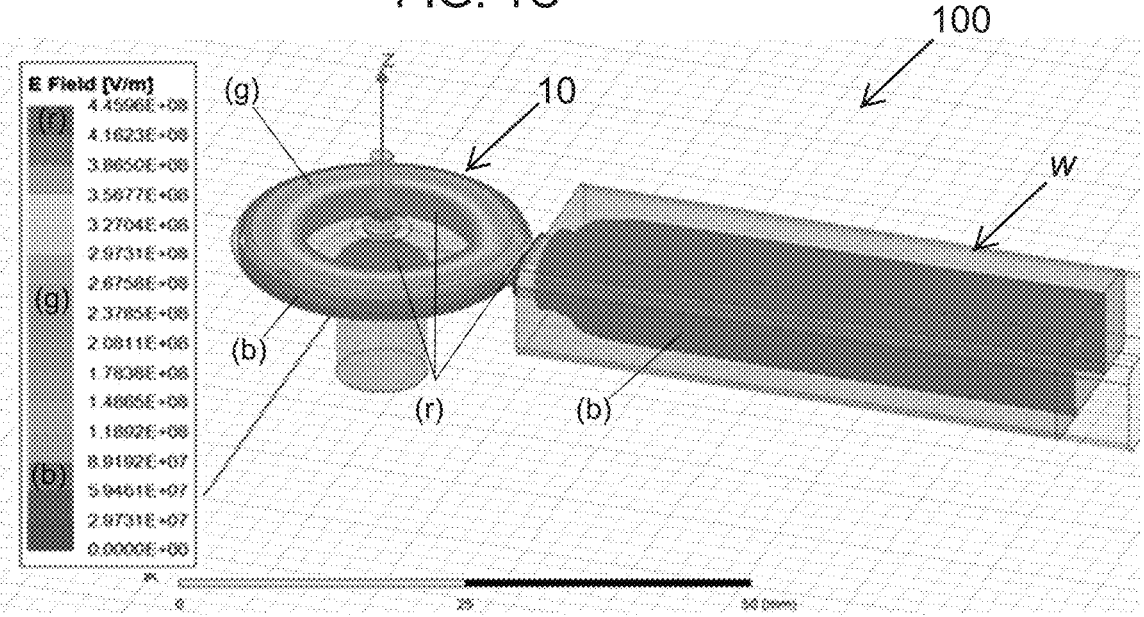
FIG. 1D illustrates an electric field map of the beam monitor in FIG. 1A.
Figure 2:
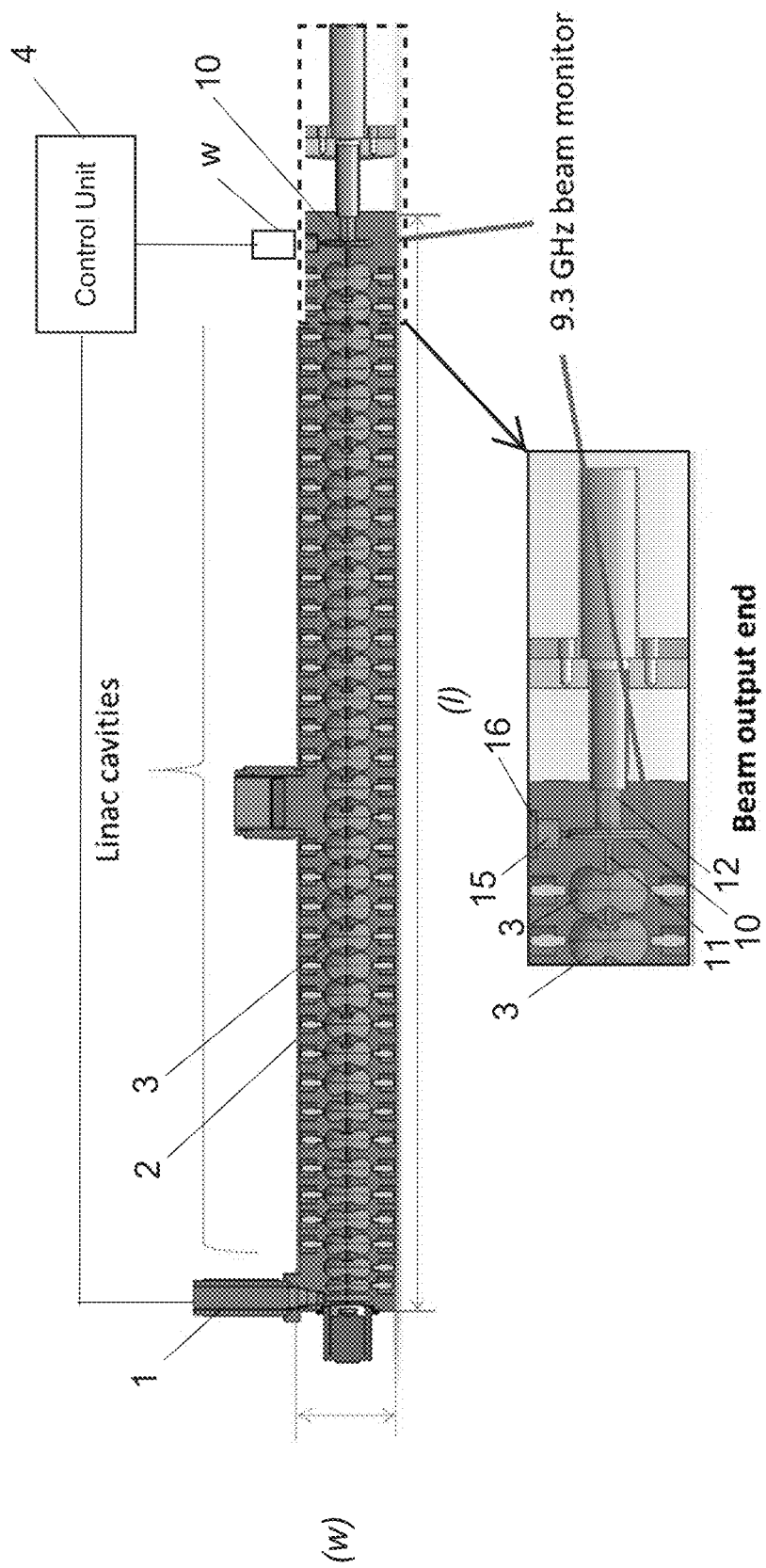
FIG. 2 illustrates a linear accelerator model with an integrated beam intensity monitor, in accordance with some embodiments.

FIGS. 1A-C illustrate an example beam intensity monitor 100 and FIG. 1D shows an electric field map of the example beam monitor. FIG. 1A shows a side view in the x-direction, FIG. 1B shows an end view in the y-direction, and FIG. 1C shows a top view in the x-direction. In this embodiment, the beam monitor 100 includes a circular beam cavity 10 extending along the x-y plane, and having an inlet pipe 11 and outlet pipe 12 extending along the z-axis in opposite directions from the center of the cavity. The beam cavity 10 is coupled to a waveguide w via a protrusion 13 extending to a window 14 filled with a ceramic plug 15. As shown, the waveguide w extends from the periphery of the beam cavity 10. In this embodiment, the outlet 12 is substantially larger than the input 11 (e.g., four times larger or more) and the ratio of radius and height of the cavity is relatively small (e.g., 4:1 or less) such that that the amount of beam energy transmitted to the waveguide w is relatively small (e.g., 300 kW or less for a 3 MW beam, typically 100 kW or less for a 3 MW beam). It is appreciated that this design can be fabricated separately, or can be machined within the same block of metal as the accelerator (as shown in FIG. 2). In some embodiments, a readout circuit can be used to diagnose the bunch one by one.

The output power for the beam monitor is given by the following equation:

$$P_{out} = \frac{\beta}{(1+\beta)^2} I^2 R$$

where $$\beta = \frac{Q_o}{Q_e}$$

is the coupling coefficient, I is the current,

R is the shunt impedance, $P_{out}$ is the output for beam monitor, $Q_o$ of the cavity is 4019, and shunt impedance is $3.17 \times 10^5$.

The result of modal analysis of the cavity is listed in Table 1.

TABLE 1

Modal Analysis of 9.3 GHz Cavity

| Mode type | Freq | $Q_0$ | $Q_t$ | (R/Q) |
|---|---|---|---|---|
| $TM_{010}$ | 9.30 GHz | 4019 | 648 | 78.87 Ω |

Figure 3:
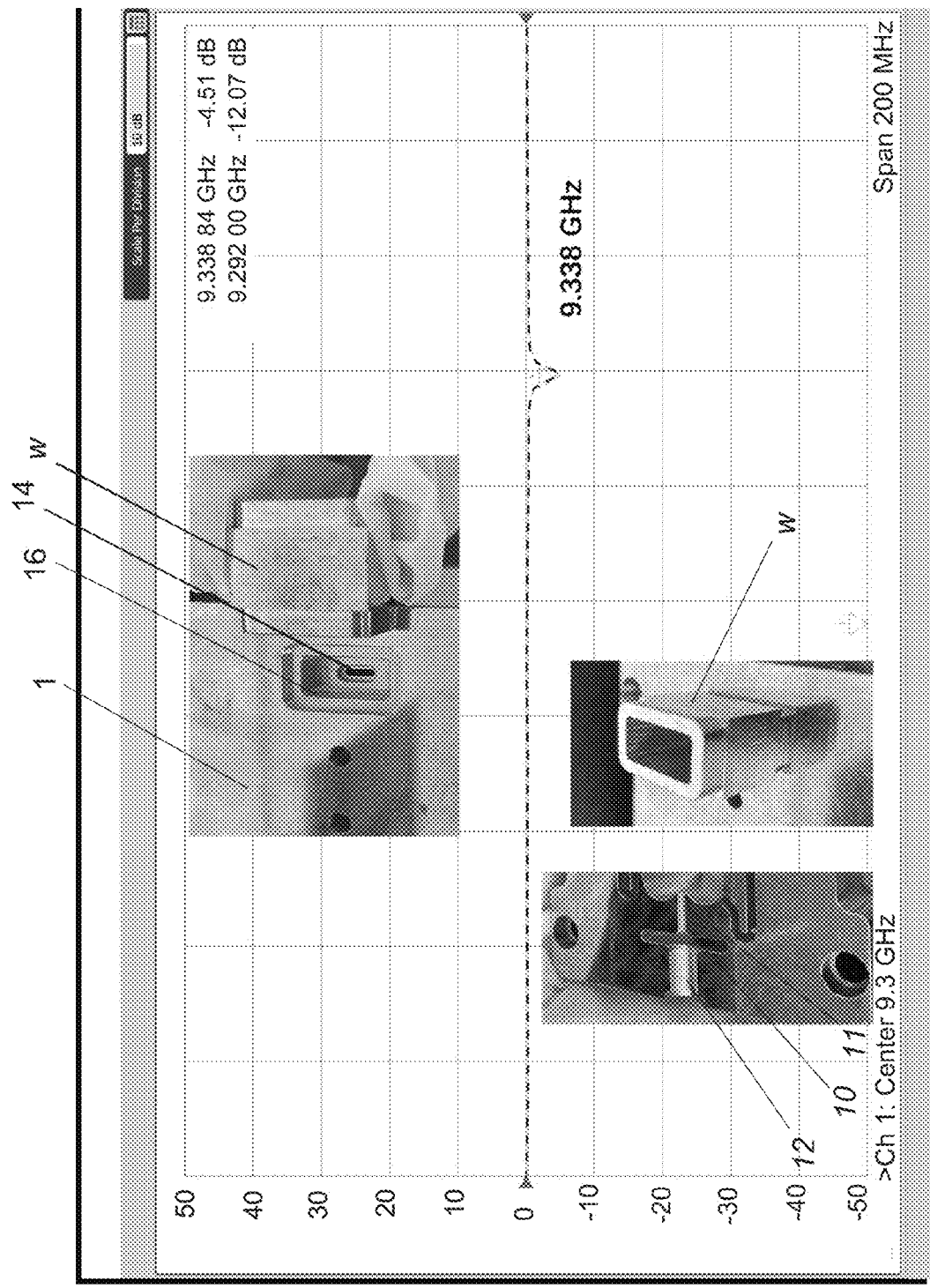
FIG. 3 illustrates a prototype of an exemplary beam monitor and associated cold test result, in accordance with some embodiments.

FIG. 2 shows a LINAC with an integrated beam intensity monitor 100 shown along a cross-sectional view along the beamline. The LINAC includes an electron gun 1 that injects electrons into the LINAC body 2 formed of a conductive material (e.g., copper) and having defined therein, a series of multiple buncher cavities 3 and the beam cavity 10 for the beam monitor 100 at a distal end thereof. It can be seen that the beam cavity 10 is considerably smaller in height than the buncher cavities. The beam cavity 10 is purposely designed to be less efficient than the buncher cavities so as to limit the energy that is generated in the cavity and transmitted to the waveguide, for example, 100 kW or less would be transmitted for a 3 MW beam. Accordingly, the majority of the beam energy is transmitted to the outlet pipe 12 and continues along the beamline. Along the top periphery of the beam cavity 10 is opening filled with a ceramic plug (i.e., RF window) that opens into recess 16 that interfaces with the rectangular waveguide w (as shown in FIG. 3). In this embodiment, the LINAC generates a 9.3 GHz beam, the accelerator body 2 having a width (w) of 5.17 cm and a total length (l) of 58.77 cm. It is appreciated, however, that these concepts could be used scaled accordingly to accommodate varying sizes and frequencies of LINACs.

In some embodiments, the accelerator body and integrated beam monitor can be machined from a conductive metal, such as copper, for example, a split-design with upper and lower halves assembled to form the cavities of the beamline, as shown in the prototype shown in FIG. 3. Shown at lower left, the top of the bottom plate is visible, showing the cavity 10 and the two different sizes of the inlet 11 and outlet 12 pipes. At top, the upper side of the upper plate is shown, which illustrates the pill shaped hole 14 that holds the ceramic (e.g., alumina) plug 15 and a pocket or recess 16 to hold the coupling waveguide w. The graph in FIG. 3 illustrates the cold test result, which shows a resonant frequency of 9.338 GHz.

In a second aspect, the beam intensity monitor in FIG. 1 is fabricated separately and then attached to an existing LINAC beamline at a distal end thereof. This embodiment is designed for applications that require stand-alone beam monitors such as an aftermarket beam monitor that can be added to an existing medical or industrial LINACs. The beam monitor structure can be substantially similar in design to the integrated beam monitor described above. The beam unit can be designed for a particular LINAC frequency (e.g., 9.3 GHz) or can include a replaceable or tunable waveguide, thereby allowing the beam monitor to be easily converted to other frequencies of LINAC as desired.

In a third aspect, the invention pertains to an advanced beam monitor that monitors multiple beam characteristics by use of a muti-moded beam cavity and multiple waveguides attached thereto, each waveguide corresponding to a different mode from which a respective beam characteristic can be measured. Advantageously, this beam monitor design allows for measurement of beam characteristics directly from the beam in a non-destructive manner. This allows complete beam information of the beam to be determined simultaneously and in real-time, which can be fed back into the beam control, for example to adjust position or size, or to adjust a therapy based on beam intensity. This beam monitor is the most sophisticated version of the beam monitors concepts described herein. In this embodiment, the beam monitor is designed to monitor the beam charge, position, size with only one cavity with multiple couplers to multiple waveguides. An example of such a beam monitor is shown in FIG. 5A, which shows a beam cavity 20 having an inlet and outlet, as described previously and multiple waveguides w coupled to and in communication with the beam cavity.

Figure 4:
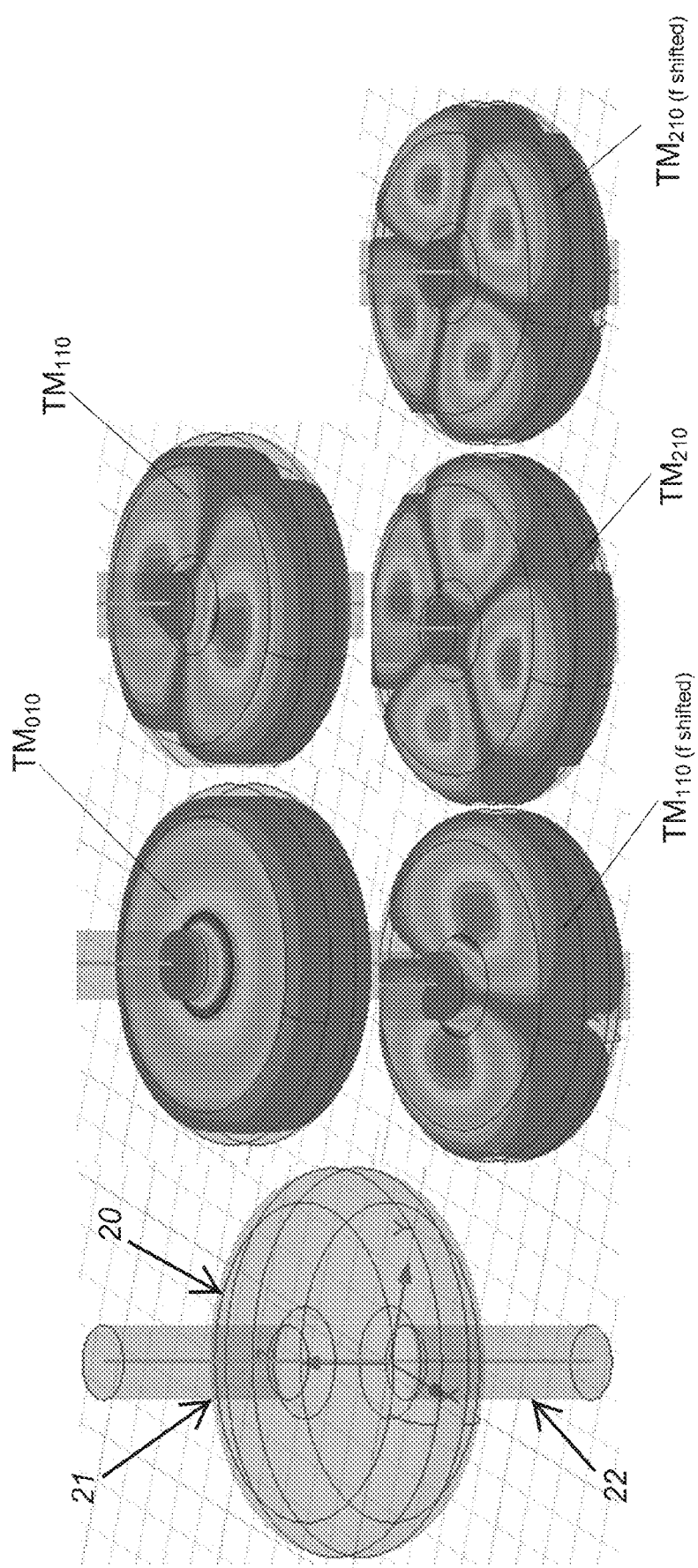
FIG. 4 illustrates an electric field map of five different modes of a central cavity of a beam cavity of an advanced beam monitor, in accordance with some embodiments.
Figure 6D:
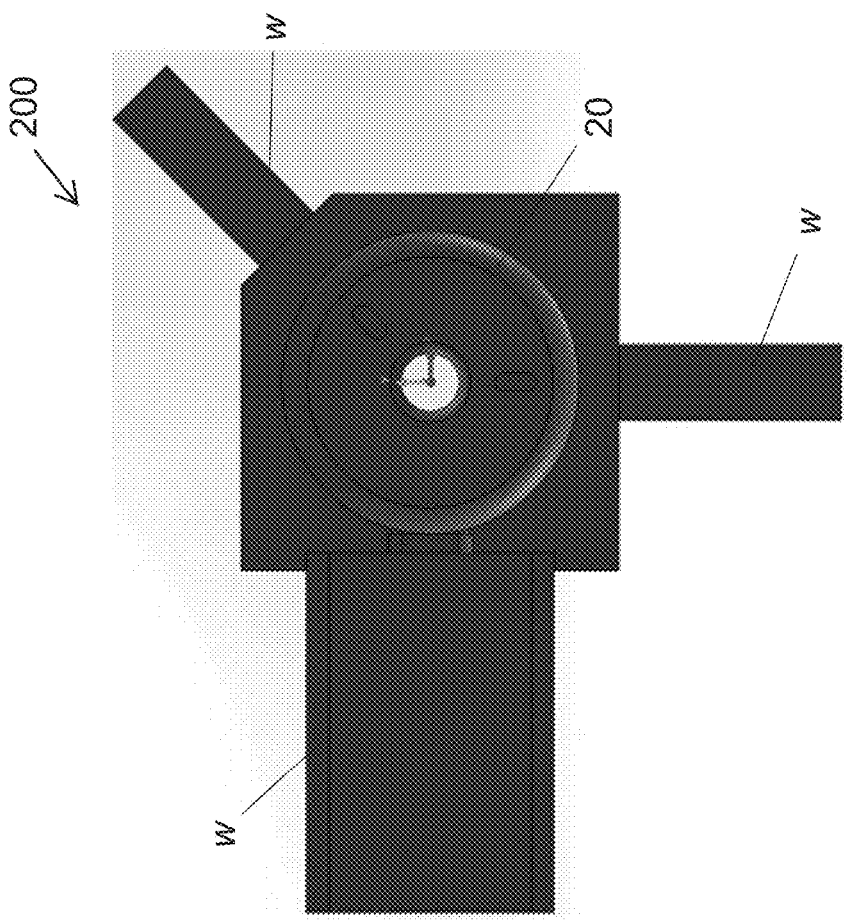
Figure 6C:
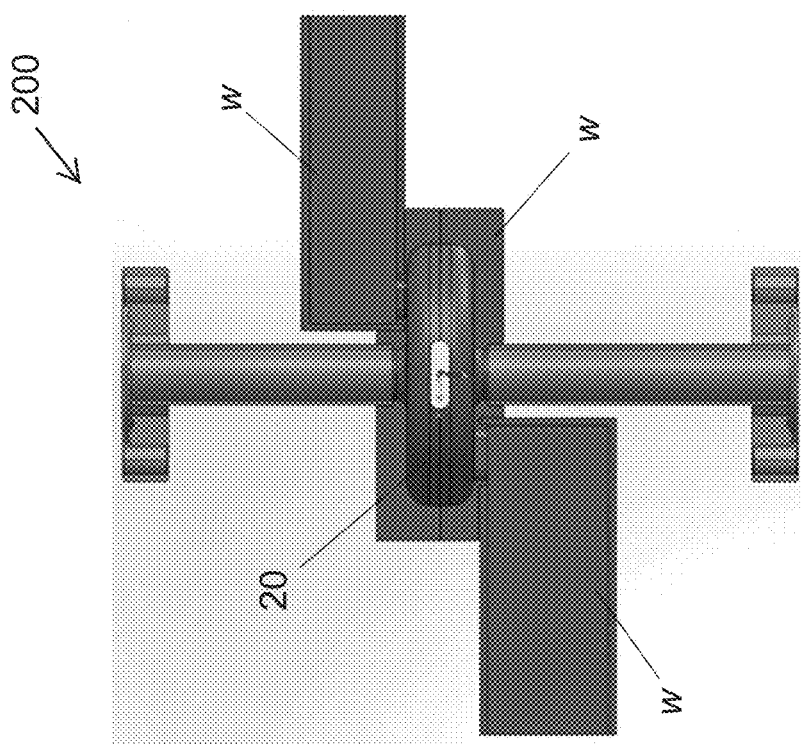

The geometry of the beam cavity 20 selected is asymmetrical to separate the modal frequency of different polarizations, so that one can distinguish between x and y beam position and size not only with coupling location, but also with frequency discrimination. The beam cavity shown at left in FIG. 4 is not circular, but rather is slightly elliptical in shape, the x-dimension being greater than the y-dimension (e.g., by 5% or less, typically about 1-2%), at least enough to shift the frequencies of the excitation mode associated with each dimension, thereby creating a distinct excitation mode for each of the x- and y-dimensions. This eccentricity shifts the frequencies with respect to at least two modes so that these modes can be used to determine position and size with respect to the x-axis and y-axis.

FIG. 4 shows the differing excitation modes provided by the eccentric beam cavity 20, which includes: $TM_{010}$, $TM_{110}$, $TM_{210}$, and frequency shifted $TM_{110}$, $TM_{210}$ modes due to the eccentricity of the beam cavity. The characteristic parameters of the electric fields shown in FIG. 4 are listed in Table 2 below.

w that is best positioned to detect a signal from each of the respective excitation modes. Due to the limited clearance about the beam cavity, the rectangular waveguides have been precisely placed at particular locations that allow for accurate signal detection from each of the five excitation modes simultaneously.

In this embodiment, there is one rectangular waveguide position at a periphery of the beam cavity (see FIG. 4A) for detection of beam charge, two rectangular waveguides positioned at differing locations along the top major face (see FIGS. 4B and 4C) for detection of beam position along each of x-axis and y-axis, and two rectangular waveguides positioned at differing locations along the bottom major face (see FIGS. 4C and 4D) for detection of beam size along each of x-axis and y-axis. This particular arrangement is advantageous as it allows for determination of all of the above beam characteristics (i.e., complete beam information), yet still allows the beam monitor to be relatively compact, and even integrated within the LINAC.

In another aspect, a multi-channel readout circuit can be used to simultaneously process the signals from each waveguide so that the beam characteristics can be determined simultaneously and in real-time. In the embodiment shown, the cavity is designed at 5.712 GHz, half of the operating frequency of medical LINACs used for various high energy radiation therapy applications. The output model frequencies cover 5.712 GHz. It is appreciated that these same design concepts can be scaled and/or alternated for other frequencies. Additionally, while five waveguides are shown

TABLE 2

Modal Analysis of 5.712 GHz Cavity

|  | $Q_0$ | R ($\Omega$) for $TM_{010}$ $\rho = \dfrac{(dV_c/dr)^2}{P_w}\left(\dfrac{\Omega}{mm^2}\right)$ for $TM_{110}$ $\rho = \dfrac{(d^2V_c/dr^2)^2}{P_w}\left(\dfrac{\Omega}{mm^4}\right)$ for $TM_{210}$ | $dV_c/dr\left(\dfrac{V}{mm}\right)$ for $TM_{110}$ $d^2V_c/dr^2\left(\dfrac{V^2}{mm^2}\right)$ for $TM_{210}$ | $\dfrac{R_s}{Q}(\Omega)$ for $TM_{010}$ $\dfrac{\rho}{Q}\left(\dfrac{\Omega}{mm^2}\right)$ for $TM_{110}$ $\dfrac{\rho}{Q}\left(\dfrac{\Omega}{mm^4}\right)$ for $TM_{210}$ |
|---|---|---|---|---|
| $TM_{010}$ | 8524 | $1.21 \times 10^6$ ($\Omega$) | N/A | 141.6($\Omega$) |
| $TM_{110}$ | 10304 | $26131\left(\dfrac{\Omega}{mm^2}\right)$ | $3.745 \times 10^5 \left(\dfrac{V}{mm}\right)$ | $2.53\left(\dfrac{\Omega}{mm^2}\right)$ |
| $TM_{110}$ | 10315 | $26567\left(\dfrac{\Omega}{mm^2}\right)$ | $3.793 \times 10^5 \left(\dfrac{V}{mm}\right)$ | $2.57\left(\dfrac{\Omega}{mm^2}\right)$ |
| $TM_{210}$ | 12343 | $150.86\left(\dfrac{\Omega}{mm^4}\right)$ | $2.03 \times 10^4 \left(\dfrac{V^2}{mm^2}\right)$ | $0.012\left(\dfrac{\Omega}{mm^4}\right)$ |
| $TM_{210}$ | 12347 | $153.63\left(\dfrac{\Omega}{mm^4}\right)$ | $3.06 \times 10^4 \left(\dfrac{V^2}{mm^2}\right)$ | $0.012\left(\dfrac{\Omega}{mm^4}\right)$ |

The beam monitor 200 shown in FIG. 5A further includes five waveguide couplers along the beam cavity that are designed for five excitation modes. RF windows (e.g., ceramic filled openings) for vacuum isolation are located at the output ports of the beam cavity connecting to the waveguide couplers that connect to the five waveguides (see also FIG. 7). FIGS. 4A-4B show the five different excitation modes that exist in the eccentric cavity 20 simultaneously, and indicate (by arrow) the particular rectangular waveguide here, it is appreciated that various other embodiments could include more or fewer waveguides, depending on the application and beam characteristics to be determined.

In order to maintain ultra-high vacuum inside the cavity, RF windows for vacuum isolation are located at the output ports of the cavity connecting to the waveguides. A 99.5% or higher purity of alumina substrates are selected for fabrication. In some embodiments, alumina substrates are brazed to the cavity and then the waveguide is brazed together. The geometry of the 5 couplers and its field map at five different modes are illustrated in FIG. 5A.

The output voltage for the $TM_{010}$, $TM_{110}$ and $TM_{210}$ mode are given by the equations:

$$P_{e\_TM010} = \frac{\omega U}{Q_e} = \frac{(\omega q)^2}{2Q_o}\left(\frac{R_s}{Q}\right)\frac{\beta^2}{(1+\beta)}$$

$$P_{e\_TM110} = \frac{\omega^2}{4}\left(\frac{\rho}{Q}\right)\frac{\beta}{Q_o}q^2 dx^2$$

$$P_{e\_TM210} = \frac{\omega^2 \beta}{2Q_o}\left(\frac{\rho}{Q}\right)(\langle dx \rangle^2 - \langle dy \rangle^2 + \delta x^2 - \delta y^2)^2 q^2$$

where ω is angular frequency, q is the charge amount/bunch,

Q is $$Q_t = \frac{1}{\frac{1}{Q_o} + \frac{1}{Q_e}},$$

$R_s$ is shunt impedance, $$\beta = \frac{Q_o}{Q_e}$$

is the coupling coefficient,

ρ is the kick factor, the locations of charge in x, y directions are dx and dy, and the variation of locations are δx and δy, and the bunch size are σx and σy.

The output signal power of the monopole mode ($TM_{010}$) is proportional to the beam charge squared. The output power of the dipole modes ($TM_{110}$) is sensitive to the beam location in the x or y directions. The output power of the quadrupole modes ($TM_{210}$) is determined by the beam location and bunch size in the x and y directions.

Figure 8:
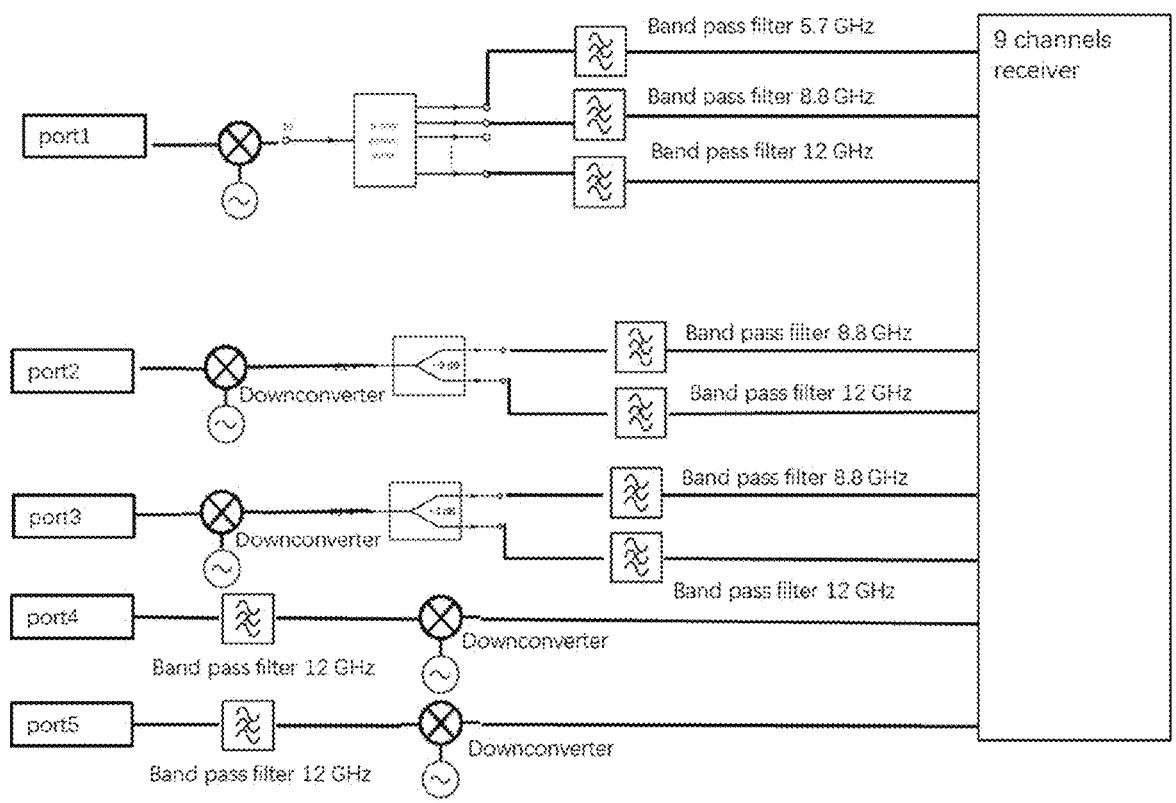
FIG. 8 shows the readout circuit for simultaneously measuring the signals from each of the five waveguide ports, in accordance with some embodiments.

FIGS. 6A-6D show various view of a mechanical representation of the advanced beam monitor (e.g., a 5.712 GHz beam monitor). In some embodiments, direct conversion architecture is leveraged in the readout circuits. A commercial RF receiver can be used, and typically covers up to 6 GHz. Downconverter devices can be used to mix the higher order modes output power to less than 6 GHz. The schematic of an exemplary readout circuit for the 5.712 GHz design is illustrated in FIG. 8. In this readout circuit, nine channels are recorded from five ports in total.

Figure 7:
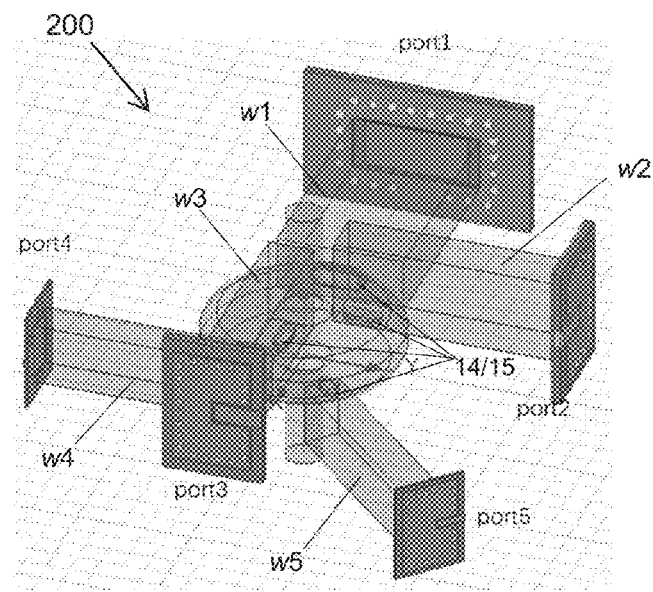
FIG. 7 illustrate another view of an advanced beam monitor showing the RF windows and ports associated with each waveguide, in accordance with some embodiments.

FIG. 7 depicts another view of the advanced beam monitor 200, which more clearly shows the RF windows 14, 15 between the respective waveguides and beam cavity and which further shows the Ports 1-5 associated with waveguides w1-w5, which includes signal detectors for measuring the signals from each waveguide, which are utilized in the readout circuit shown in FIG. 8. It is appreciated that this is but one implementation and that variations of the advanced beam monitor and associated readout circuit can be realized in keeping with the inventive concepts described herein.

Figure 9:
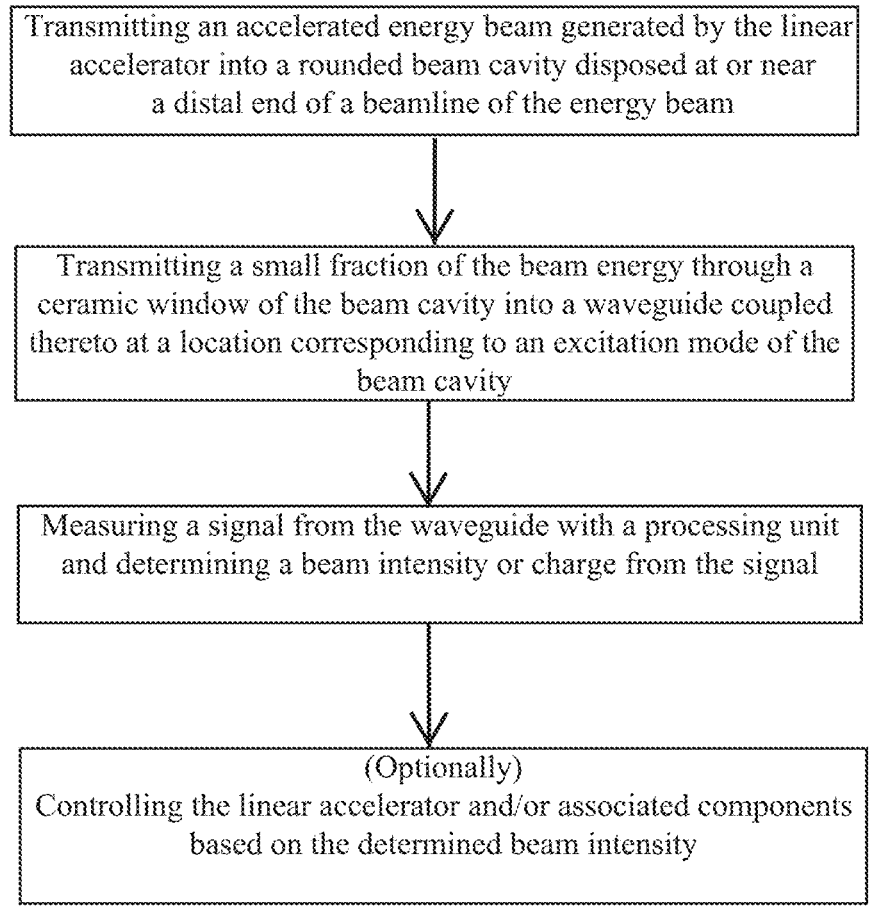
FIG. 9 shows a method of monitoring beam intensity using a beam monitor, in accordance with some embodiments.
Figure 10:
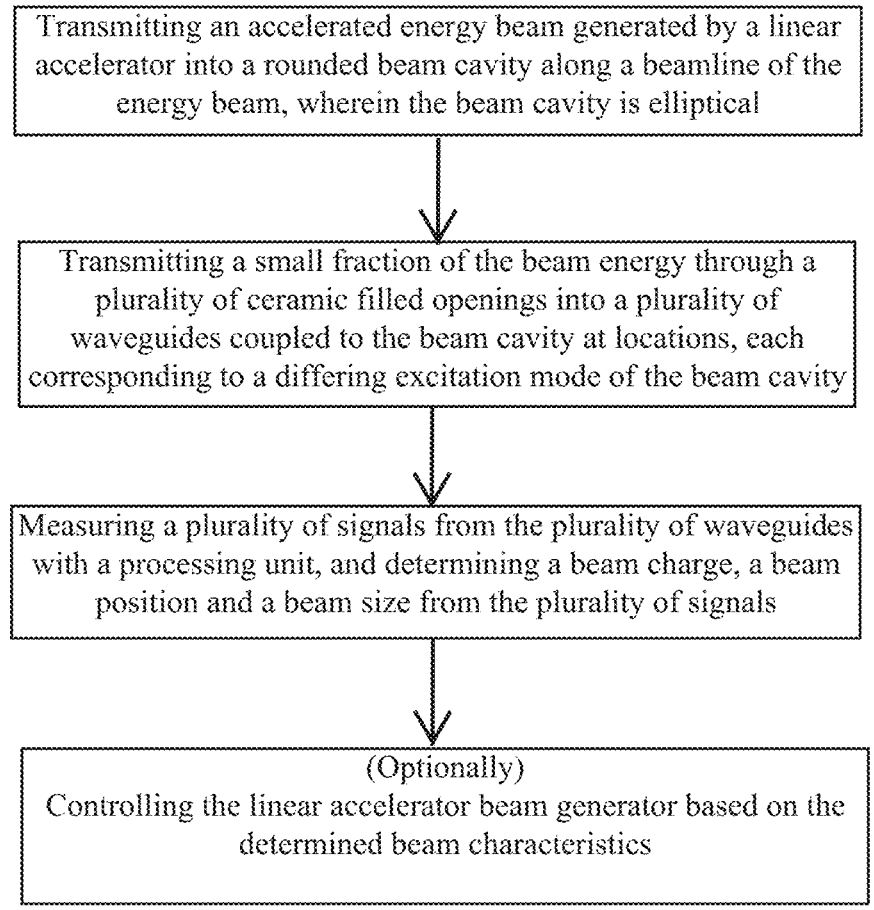
FIG. 10 shows a method of monitoring beam complete beam information using an advanced beam monitor, in accordance with some embodiments.

FIGS. 9-10 depict example methods of using the beam monitors described above. FIG. 9 pertains to a method of determining beam intensity using the beam intensity monitor described above. The method can include steps of: transmitting an accelerated energy beam generated by the linear accelerator into a rounded beam cavity disposed at or near a distal end of a beamline of the energy beam, transmitting a small fraction of the beam energy through a ceramic window of the beam cavity into a waveguide coupled thereto at a location corresponding to an excitation mode of the beam cavity, measuring a signal from the waveguide with a processing unit and determining a beam intensity or charge from the signal, and optionally, controlling the linear accelerator and/or associated components based on the determined beam intensity. FIG. 10 pertains to a method of utilizing an advanced beam monitor to obtain complete beam information, as described above. The method can include steps of: transmitting an accelerated energy beam generated by a linear accelerator into a rounded beam cavity along a beamline of the energy beam, wherein the beam cavity is elliptical, transmitting a small fraction of the beam energy through a plurality of ceramic filled openings into a plurality of waveguides coupled to the beam cavity at various locations, each corresponding to a differing excitation mode of the beam cavity, measuring a plurality of signals from the plurality of waveguides with a processing unit, and determining a beam charge, a beam position and a beam size from the plurality of signals, and optionally, controlling the linear accelerator beam generator based on the determined beam characteristics.

Figure 11:
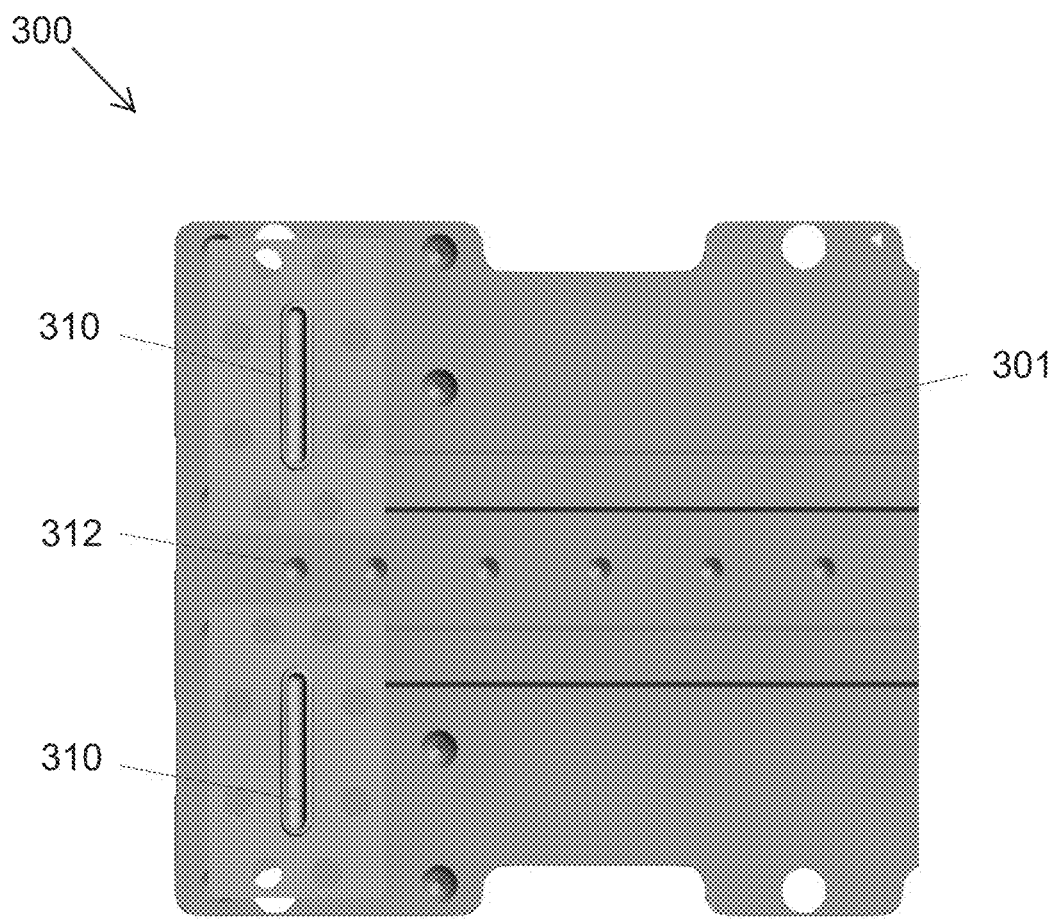
FIG. 11 shows a portion of a linear accelerator with integrated beam monitor, in accordance with some embodiments.

FIG. 11 shows a portion of a linear accelerator with integrated beam monitor 300, in accordance with some embodiments. The linear accelerator body 301 is designed with a pair of beam monitor coupling ports 310 that are off-axis so that tuning of the beam monitor cavity can be performed from an on-axis tuning pin or feature 312. The beam monitor coupling ports can be an integral feature of the linear accelerator body.

As shown, the linear accelerator body can include multiple such tuning pins or features 312 corresponding to multiple cavities of the linear accelerator. The two ports allow for reduction of the Q-factor of the beam monitor to any desired value and hence the control the amount of radiation received from one of the coupling ports. This control results in savings in external components needed to attenuate the strong signal emitted from the beam monitor. On the other hand, the Q-factor can be raised if the current passing through is too small to generate an RF signal. In some embodiments, by measuring the phase of the signal coming out of the beam monitor, and combining that with the linear accelerator simulations, one can determine one or more beam characteristics, such as estimating the energy of the beam. One or more tuning features 314 (e.g., tuning pins) are disposed on-axis to allow tuning of the beam monitor cavity 316. While two beam monitor ports are shown, it is appreciated such linear accelerator systems could include one or more off-axis beam monitor coupling ports as well as one or more tuning features that are on-axis.

Figure 12:
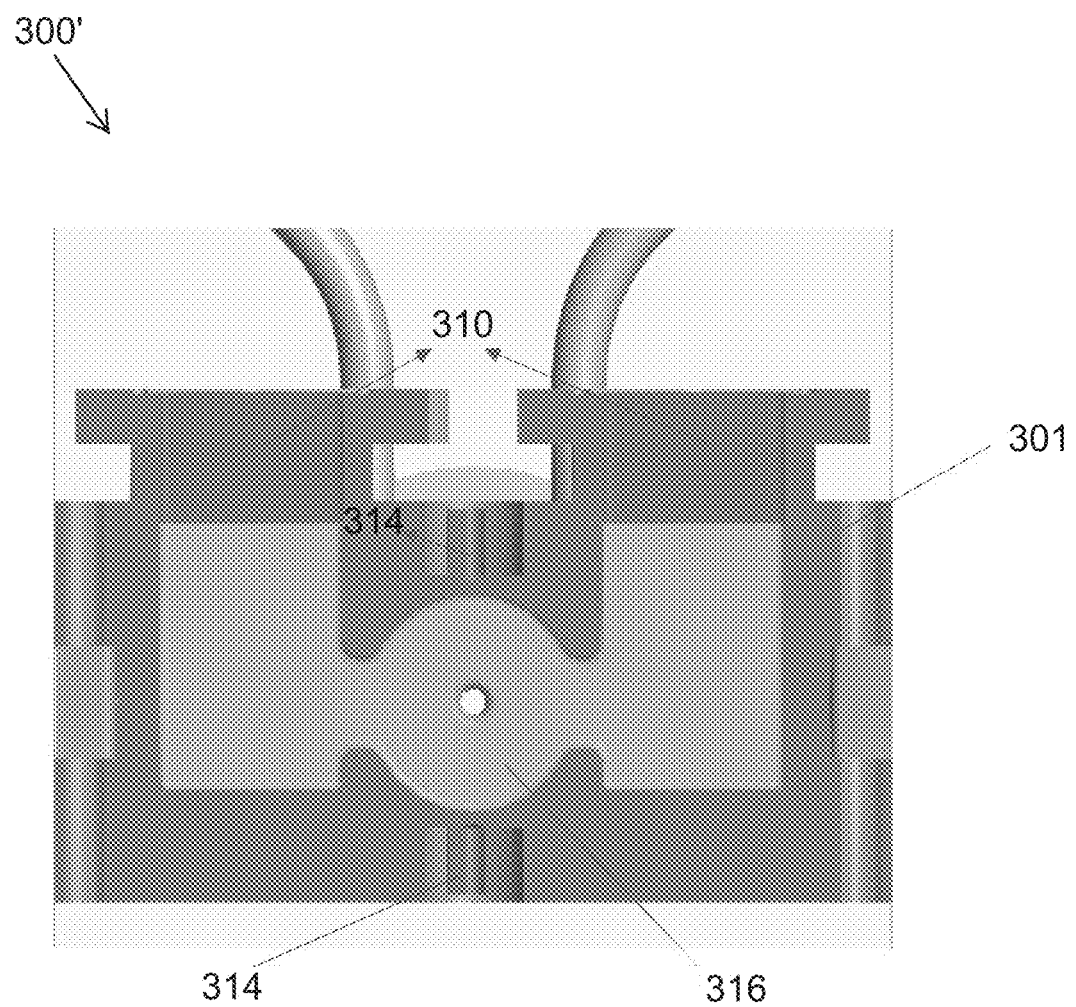
FIG. 12 shows a cross-sectional view of a portion of a linear accelerator with integrated beam monitor, in accordance with some embodiments.

FIG. 12 shows a cross-sectional view 300' of the portion of a linear accelerator with integrated beam monitor, in accordance with some embodiments. The beam monitor coupling ports 310 are disposed off-axis of and extend upwards from the beam monitor cavity 316. In this embodiment, the system includes a pair of tuning features disposed on opposite sides of the beam monitor cavity and aligned (e.g., on-axis) with the beam cavity. The invention can further encompass methods of making such linear accelerators and methods of using such linear accelerators.

The methods, systems, and devices discussed above are examples. Various configurations can omit, substitute, or add various procedures or components as appropriate. For instance, in alternative configurations, the methods can be performed in an order different from that described, and/or various stages can be added, omitted, and/or combined. Also, features described with respect to certain configurations can be combined in various other configurations. Different aspects and elements of the configurations can be combined in a similar manner. Also, technology evolves and some of the elements as described are provided as non-limiting examples and thus do not limit the scope of the disclosure or claims.

Specific details are given in the description to provide a thorough understanding of exemplary configurations (including implementations). However, configurations can be practiced without these specific details. For example, well-known circuits, processes, algorithms, structures, and techniques have been shown without unnecessary detail in order to avoid obscuring the configurations. This description provides exemplary configurations that do not limit the scope, applicability, or configurations of the claims. Rather, the preceding description of the configurations will provide those skilled in the art with an enabling description for implementing described techniques.

Also, configurations can be described as a process which is depicted as a flow diagram or block diagram. Although each can describe the operations as a sequential process, some of the operations can be performed in parallel or concurrently. Furthermore, examples of the methods can be implemented by hardware, software, firmware, middleware, microcode, hardware description languages, or any combination thereof. When implemented in software, firmware, middleware, or microcode, the program code or code segments to perform the necessary tasks can be stored in a non-transitory computer-readable medium such as a storage medium. Processors can perform the described tasks.

Having described several exemplary configurations, various modifications, alternative constructions, and equivalents can be used without departing from the spirit of the disclosure. The above elements can be components of a larger system, wherein other rules can take precedence over or modify the application of the invention. Accordingly, the above description does not bound the scope of the claims. All patents, patent applications, and other publications cited in this application are incorporated by reference in their entirety for all purposes.

What is claimed is:

1. A beam monitor for monitoring a beam from a linear accelerator, the beam monitor comprising:
   a body having a beam cavity defined therein and extending along an x-y plane, wherein the beam cavity is generally rounded about a central axis extending in a z-direction;
   an input in communication with the beam cavity, the input configured for transmittal of an accelerated beam into the beam cavity, the input having an input diameter;
   an output in communication with the beam cavity, the output configured for transmittal of the accelerated energy beam out from the beam cavity, the output having an output diameter that is equal to or larger than the input diameter;
   wherein the input and output extend from a center of the cavity along a z-axis perpendicular to the x-y plane, the input and output extending in opposite directions;
   one or more windows in the beam cavity disposed at a location of a respective excitation mode of the beam cavity; and
   a plurality of waveguides coupled to the one or more windows configured for measuring one or more beam characteristics from one or more signals generated by beam energy transmitted into the plurality of waveguides through the one or more windows of the beam cavity, wherein the one or more beam characteristics include any of: beam intensity, charge, current, size, position, emittance or any combination thereof;
   wherein each of the plurality of waveguides is arranged according to the respective excitation mode, wherein each excitation mode corresponds to a beam characteristic.

2. The beam monitor of claim 1, wherein the one or more beam characteristics comprise beam charge or intensity.

3. The beam monitor of claim 2, wherein the window is disposed on an external periphery of the beam cavity.

4. The beam monitor of claim 1, wherein each of the one or more windows comprise a ceramic disposed in an opening.

5. The beam monitor of claim 4, wherein each of the plurality of waveguides comprises a rectangular waveguide.

6. The beam monitor of claim 1, wherein the beam monitor is configured for measuring one or more characteristics of a 9.3 GHz beam.

7. The beam monitor of claim 1, wherein a ratio of radius and height of the beam cavity is 4:1.

8. The beam monitor of claim 1, wherein the body is a separate component that is coupled to a distal end of the linear accelerator.

9. A beam monitor for monitoring a beam from a linear accelerator, the beam monitor comprising:
   a body having a beam cavity defined therein and extending along an x-y plane, wherein the beam cavity is generally rounded about a central axis extending in a z-direction;
   an input in communication with the beam cavity, the input configured for transmittal of an accelerated beam into the beam cavity, the input having an input diameter;
   an output in communication with the beam cavity, the output configured for transmittal of the accelerated energy beam out from the beam cavity, the output having an output diameter that is equal to or larger than the input diameter;
   wherein the input and output extend from a center of the cavity along a z-axis perpendicular to the x-y plane, the input and output extending in opposite directions;
   one or more windows in the beam cavity disposed at a location of a respective excitation mode of the beam cavity; and
   one or more waveguides coupled to the one or more windows configured for measuring one or more beam characteristics from one or more signals generated by beam energy transmitted into the one or more waveguides through the one or more windows of the beam cavity, wherein the one or more beam characteristics include any of: beam intensity, charge, current, size, position, emittance or any combination thereof;
   wherein the beam cavity, the input diameter, the output diameter, and the one or more windows are dimensioned and arranged so that only a suitable fraction of the beam energy from the accelerated beam is transmitted through the one or more windows.

10. The beam monitor of claim 9, wherein the suitable fraction comprises 100 kW or less for a 3 MW or more beam.

11. The beam monitor of claim 9, wherein the beam cavity, the input diameter, the output diameter, and the one or more windows are dimensioned so that 10% or less of the beam energy from the accelerated beam is transmitted through the one or more windows.

12. The beam monitor of claim 9, wherein the beam cavity, the input diameter, the output diameter, and the one or more windows are dimensioned so that 3% or less of the beam energy from the accelerated beam is transmitted through the one or more windows.

13. A beam monitor for monitoring a beam from a linear accelerator, the beam monitor comprising:
- a body having a beam cavity defined therein and extending along an x-y plane, wherein the beam cavity is generally rounded about a central axis extending in a z-direction;
- an input in communication with the beam cavity, the input configured for transmittal of an accelerated beam into the beam cavity, the input having an input diameter;
- an output in communication with the beam cavity, the output configured for transmittal of the accelerated energy beam out from the beam cavity, the output having an output diameter that is equal to or larger than the input diameter;
- wherein the input and output extend from a center of the cavity along a z-axis perpendicular to the x-y plane, the input and output extending in opposite directions;
- one or more windows in the beam cavity disposed at a location of a respective excitation mode of the beam cavity; and
- one or more waveguides coupled to the one or more windows configured for measuring one or more beam characteristics from one or more signals generated by beam energy transmitted into the one or more waveguides through the one or more windows of the beam cavity, wherein the one or more beam characteristics include any of: beam intensity, charge, current, size, position, emittance or any combination thereof;
- wherein the beam cavity is distal of a plurality of buncher cavities of the linear accelerator for acceleration of the beam along the beam line, wherein the beam cavity has a volume that is less than 25% of each of the volumes of the plurality of buncher cavities.

14. The beam monitor of claim 13, wherein the body is a distal portion of the linear accelerator block in which the plurality of buncher cavities are formed.

15. A beam monitor for monitoring a beam from a linear accelerator, the beam monitor comprising:
- a body having a beam cavity defined therein and extending along an x-y plane, wherein the beam cavity is generally rounded about a central axis extending in a z-direction;
- an input in communication with the beam cavity, the input configured for transmittal of an accelerated beam into the beam cavity, the input having an input diameter;
- an output in communication with the beam cavity, the output configured for transmittal of the accelerated energy beam out from the beam cavity, the output having an output diameter that is equal to or larger than the input diameter;
- wherein the input and output extend from a center of the cavity along a z-axis perpendicular to the x-y plane, the input and output extending in opposite directions;
- one or more windows in the beam cavity disposed at a location of a respective excitation mode of the beam cavity; and
- one or more waveguides coupled to the one or more windows configured for measuring one or more beam characteristics from one or more signals generated by beam energy transmitted into the one or more waveguides through the one or more windows of the beam cavity, wherein the one or more beam characteristics include any of: beam intensity, charge, current, size, position, emittance or any combination thereof;
- wherein the beam cavity is distal of a plurality of buncher cavities of the linear accelerator for acceleration of the beam along the beam line, wherein the beam cavity has a volume that is less than 10% of the volumes of each of the plurality of buncher cavities.

16. A beam monitor for monitoring a beam from a linear accelerator, the beam monitor comprising:
- a body having a beam cavity defined therein and extending along an x-y plane, wherein the beam cavity is generally rounded about a central axis extending in a z-direction;
- an input in communication with the beam cavity, the input configured for transmittal of an accelerated beam into the beam cavity, the input having an input diameter;
- an output in communication with the beam cavity, the output configured for transmittal of the accelerated energy beam out from the beam cavity, the output having an output diameter that is equal to or larger than the input diameter;
- wherein the input and output extend from a center of the cavity along a z-axis perpendicular to the x-y plane, the input and output extending in opposite directions;
- one or more windows in the beam cavity disposed at a location of a respective excitation mode of the beam cavity; and
- one or more waveguides coupled to the one or more windows configured for measuring one or more beam characteristics from one or more signals generated by beam energy transmitted into the one or more waveguides through the one or more windows of the beam cavity, wherein the one or more beam characteristics include any of: beam intensity, charge, current, size, position, emittance or any combination thereof;
- wherein the output diameter is at least four times that of the input diameter.

17. A beam monitor for monitoring a beam from a linear accelerator, the beam monitor comprising:
- a body having a beam cavity defined therein and extending along an x-y plane, wherein the beam cavity is generally rounded about a central axis extending in a z-direction;
- an input in communication with the beam cavity, the input configured for transmittal of an accelerated beam into the beam cavity, the input having an input diameter;
- an output in communication with the beam cavity, the output configured for transmittal of the accelerated energy beam out from the beam cavity, the output having an output diameter that is equal to or larger than the input diameter;
- wherein the input and output extend from a center of the cavity along a z-axis perpendicular to the x-y plane, the input and output extending in opposite directions;
- one or more windows in the beam cavity disposed at a location of a respective excitation mode of the beam cavity; and
- one or more waveguides coupled to the one or more windows configured for measuring one or more beam characteristics from one or more signals generated by beam energy transmitted into the one or more waveguides through the one or more windows of the beam cavity, wherein the one or more beam characteristics include any of: beam intensity, charge, current, size, position, emittance or any combination thereof;

wherein the cavity is elliptical in shape, an x-dimension of the cavity being greater than a y-dimension so as to separate the modal frequency of different polarizations of the beam cavity;

wherein the one or more windows comprise a plurality of windows on the beam cavity; and wherein the one or more waveguides comprise a plurality of waveguides coupled to the plurality of windows and configured for measuring a plurality of beam characteristics from a plurality of signals generated by beam energy transmitted into the plurality of waveguides through the plurality of windows, wherein the one or more beam characteristics include at least: a beam charge, a beam position and a beam size.

18. The beam monitor of claim 17, wherein each of the plurality of windows is located at a differing location on the beam cavity, each location corresponding to a different excitation mode of the beam cavity.

19. The beam monitor of claim 17, wherein the beam cavity comprises at least five excitation modes and comprises five waveguides coupled thereto.

20. The beam monitor of claim 19, wherein the beam monitor is configured such that the five modes excited include a $TM_{010}$ mode, two $TM_{110}$ modes, and two $TM_{210}$ modes.

21. The beam monitor of claim 17, wherein the plurality of waveguides comprise one waveguide and corresponding window on a periphery of the beam cavity and two waveguides and corresponding windows on each of opposing major faces of the beam cavity.

22. A linear accelerator system comprising:
a linear accelerator;
the beam monitor of claim 1 disposed along the beamline at a distal end of the linear accelerator;
a processing unit with a memory having programmable instructions recorded thereon, the instructions configured for:
obtaining a plurality signal from each of the one or more waveguides; and
determining one or more beam characteristics from one or more signals from the one or more waveguides.

23. The system of claim 22, wherein the one or more beam characteristics comprises at least a beam charge, a beam position and a beam size.

24. The system of claim 22, further comprising:
a control unit communicatively coupled to the processing unit, the control unit configured to control the linear accelerator and modify control and/or adjust positioning of the beam in response to the one or more beam characteristics determined by the processing unit.

25. A method of monitoring a beam from a linear accelerator, the method comprising:
transmitting an accelerated energy beam generated by the linear accelerator into a rounded beam cavity disposed along a distal end of a beamline of the energy beam;
transmitting a fraction of the beam energy through a ceramic window of the beam cavity into a waveguide coupled to the beam cavity at a location corresponding to an excitation mode of the beam cavity, wherein the fraction comprises 100 kW or less for a 3 MW beam;
measuring a signal from the waveguide with a processing unit; and
determining a beam intensity or charge from the signal.

26. The method of claim 25, wherein the beam cavity is cylindrical and the waveguide is rectangular, wherein the waveguide is attached to the periphery of the cylindrical beam cavity.

27. The method of claim 25 wherein the linear accelerator is 9.3 GHZ.

28. The method of claim 25,
controlling the linear accelerator and/or associated components based on the determine beam intensity.

29. A method of monitoring beam characteristics comprising:
transmitting an accelerated energy beam generated by a linear accelerator into a rounded beam cavity along a beamline of the energy beam, wherein the beam cavity is elliptical;
transmitting a fraction of the beam energy through a plurality of ceramic filled openings into a plurality of waveguides coupled to the beam cavity at differing locations, each location corresponding to a differing excitation mode of the beam cavity;
measuring a plurality of signal from the plurality of waveguides with a processing unit; and
determining, from the plurality of signals, a plurality of beam characteristics that include at least: a beam charge, a beam position and a beam size.

30. The method of claim 29, wherein the plurality of waveguides comprises five waveguides, one waveguide extending from a periphery of the beam cavity and two waveguides extending from each of the opposing major faces of the beam cavity.

31. The method of claim 30, wherein the plurality of signals from the five waveguides are used to determine the beam charge, the beam position in both x- and y-directions, and the beam size in both x- and y-directions.

32. The method of claim 29,
controlling the linear accelerator beam generator based on the determined beam characteristics.

33. The method of claim 32, wherein controlling comprises adjusting positioning of the beam based on the determined beam position.

34. A linear accelerator comprising:
a linear accelerator body having a plurality of cavities;
one or more beam monitor coupling ports coupled to and disposed off-axis from a respective cavity such that one or more beam characteristics can be determined from measurements via the one or more beam monitor coupling ports;
one or more tuning features disposed adjacent and on-axis to the respective cavity to facilitate tuning of the cavity with the tuning feature; and
one or more beam monitors, each as in claim 1, the one or more beam monitors coupled to the one or more beam monitor coupling ports to determine the one or more beam characteristics.

35. The linear accelerator of claim 34, wherein the one or more tuning features comprise a pair of tuning pins disposed on opposite sides of the cavity.

36. The linear accelerator of claim 34, wherein the linear accelerator includes two beam monitor coupling ports coupled to the respective cavity to allow reduction of a Q-factor of the beam monitor cavity to any desired value and control of an amount of radiation received by each port.

37. The linear accelerator of claim 34, wherein the one or more beam monitoring coupling ports and the respective cavity are integrated within the linear accelerator body.

* * * * *